United States Patent
Usuda et al.

(10) Patent No.: US 8,615,245 B2
(45) Date of Patent: Dec. 24, 2013

(54) RADIO NETWORK CONTROLLER, BASE STATION, MOBILE STATION, MOBILE COMMUNICATION SYSTEM AND MOBILE COMMUNICATION METHOD

(75) Inventors: Masafumi Usuda, Shinagawa-ku (JP); Takehiro Nakamura, Yokosuka (JP); Hidehiro Ando, Yokohama (JP); Takuya Sato, Yokohama (JP); Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1199 days.

(21) Appl. No.: 11/721,774

(22) PCT Filed: Dec. 13, 2005

(86) PCT No.: PCT/JP2005/022882
§ 371 (c)(1),
(2), (4) Date: Oct. 28, 2009

(87) PCT Pub. No.: WO2006/064806
PCT Pub. Date: Jun. 22, 2006

(65) Prior Publication Data
US 2010/0048214 A1 Feb. 25, 2010

(30) Foreign Application Priority Data
Dec. 14, 2004 (JP) .................. 2004-361896

(51) Int. Cl.
*H04W 36/00* (2009.01)
(52) U.S. Cl.
USPC .......................................... 455/442; 455/436
(58) Field of Classification Search
USPC ......... 455/101–103, 403, 436–439, 442, 500, 455/507, 513; 370/331–332; 375/260, 267, 375/295, 299
See application file for complete search history.

(56) References Cited

U.S. PATENT DOCUMENTS

| | | | |
|---|---|---|---|
| 6,311,075 B1 * | 10/2001 | Bevan et al. | 455/562.1 |
| 6,415,149 B1 * | 7/2002 | Bevan et al. | 455/442 |
| 6,609,003 B1 | 8/2003 | Park et al. | |
| 7,319,868 B2 * | 1/2008 | Lindoff | 455/422.1 |

(Continued)

FOREIGN PATENT DOCUMENTS

| | | |
|---|---|---|
| CN | 1272262 A | 11/2000 |
| CN | 1393072 A | 1/2003 |

(Continued)

OTHER PUBLICATIONS $3^{rd}$ Generation Partnership Project; Technical Specification Group Radio Access Network; Physical layer procedures (FDD) (Release 5) 3GPP TS 25.214 V5.8.0 (Mar. 2004) Technical Specification (pp. 1-64).

(Continued)

*Primary Examiner* — Cong Tran
(74) *Attorney, Agent, or Firm* — Oblon, Spivak, McClelland, Maier & Neustadt, L.L.P.

(57) ABSTRACT

A radio network controller includes: a determination unit configured to determine a transmit diversity method to be used to transmit a signal from a base station to a mobile station, in accordance with a soft handover status of the mobile station; and an instruction/notification unit configured to instruct the transmit diversity method to the base station, in accordance with the determination result by the determination unit.

7 Claims, 9 Drawing Sheets

(56) References Cited

U.S. PATENT DOCUMENTS

| | | | |
|---|---|---|---|
| 7,450,632 B2 * | 11/2008 | Lim | 375/148 |
| 2002/0077140 A1 | 6/2002 | Monogioudis et al. | |
| 2002/0131381 A1 | 9/2002 | Kim et al. | |
| 2004/0082311 A1 * | 4/2004 | Shiu et al. | 455/403 |
| 2005/0084029 A1 | 4/2005 | Lim | |
| 2006/0233221 A1 * | 10/2006 | Xu et al. | 375/147 |

FOREIGN PATENT DOCUMENTS

| | | |
|---|---|---|
| EP | 1204219 A2 | 5/2002 |
| EP | 1 478 105 A1 | 11/2004 |
| JP | 2001-044900 | 2/2001 |
| JP | 2002-247629 | 8/2002 |
| JP | 3444859 | 6/2003 |
| JP | 2004-511953 | 4/2004 |
| WO | WO 99/59255 | 11/1999 |
| WO | WO 2004/040800 A1 | 5/2004 |

OTHER PUBLICATIONS

3rd Generation Partnership Project; Technical Specification Group Radio Access Network; Physical layer procedures (FDD) (Release 6) 3GPP TS 25.214 V6.2.0 (Jun. 2004) Technical Specification (pp. 1-64).

Office Action issued on Jan. 21, 2011 in the corresponding Chinese Patent Application No. 200580042966.0 (with English Translation).

Office Action issued Nov. 30, 2010 in JP Application No. 2004-361896 (With English Translation).

Extended European Search Report issued Jun. 29, 2012 in Patent Application No. 05816724.8.

\* cited by examiner

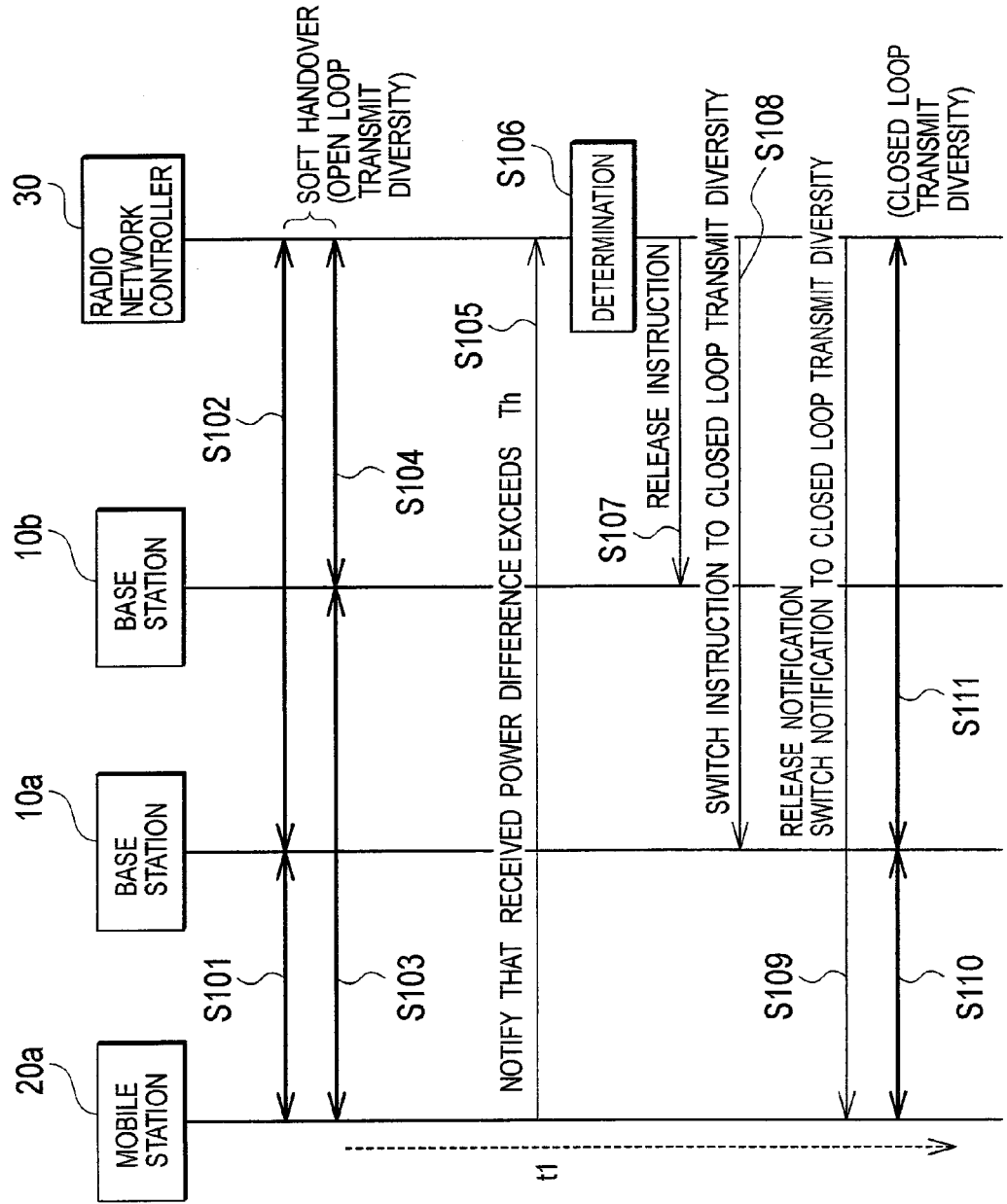

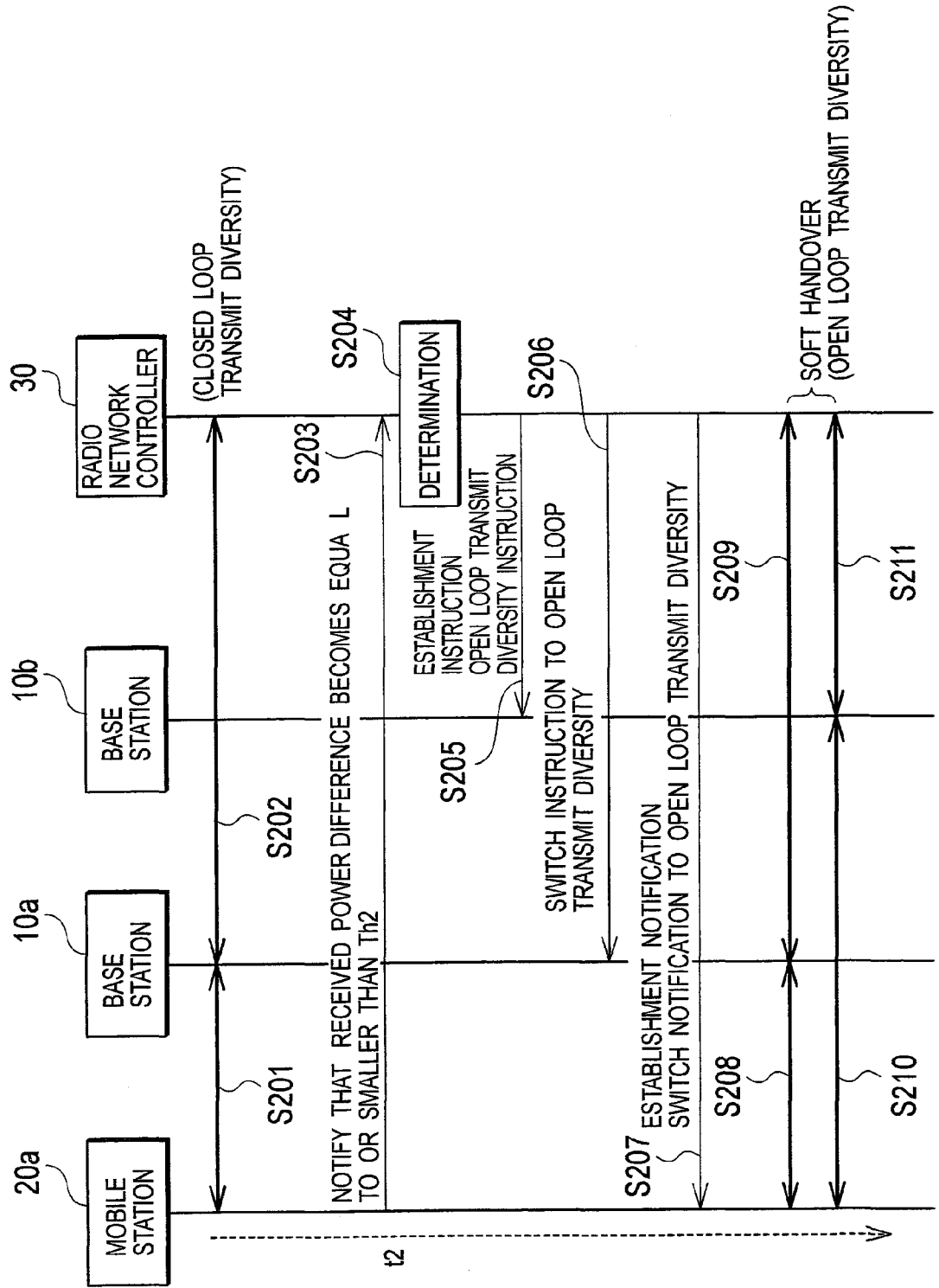

RADIO NETWORK CONTROLLER, BASE STATION, MOBILE STATION, MOBILE COMMUNICATION SYSTEM AND MOBILE COMMUNICATION METHOD

TECHNICAL FIELD

The present invention relates to a radio network controller, a base station, a mobile station, a mobile communication system and a mobile communication method.

BACKGROUND ART

In a mobile communication, a signal level may instantaneously change in a receiving side due to a multi-path fading and the like, a received quality of an uplink signal by a base station and a received quality of a downlink signal by a mobile station may deteriorate drastically. There is a receive diversity and a transmit diversity, as a technique for reducing the deterioration of the received quality. The receive diversity is a technique to receive a signal by using a plurality of antennas in a receiving side. The transmit diversity is a technique to transmit a signal by using a plurality of antennas in a transmitting side.

Since the transmit diversity can reduce the change of the signal level, without increasing a circuit size and the number of antennas in the receiving side, the transmit diversity is mainly applied to a signal transmission in a downlink from a base station to a mobile station. Two main types of the transmit diversity are an open loop transmit diversity and a closed loop transmit diversity (refer to the non-patent document "3GPP RAN TS25.214 V6.2.0", June 2004).

The open loop transmit diversity is a method in which a base station transmits a signal without receiving an instruction from a mobile station. The closed loop transmit diversity is a method in which a base station transmits a signal in accordance with an instruction from a mobile station. To be more specific, in the closed loop transmit diversity, the mobile station transmits, to the base station via an uplink, control data for instructing an antenna weight by which the base station multiplies a baseband signal, in order to obtain a higher gain by a signal combining. The mobile station performs an antenna verification for judging an antenna weight used by the base station, since an error may happen in the control data during transmission in the uplink (refer to the non-patent document "3GPP 25.214 V5.8.0, Annex A", April 2004).

Moreover, a transmitter apparatus which can apply both the open loop transmit diversity and the closed loop transmit diversity is proposed (refer to the patent document "Japanese published unexamined application No. 2001-44900", for example). And, in the closed loop transmit diversity, a technique for preventing the number of bits of the control data from being increased during soft handover, and the like (refer to the patent document "Japanese published unexamined application No. 2002-247629", for example).

However, the conventional mobile communication system has used either the open loop transmit diversity or the closed loop transmit diversity statically, regardless whether or not the mobile station is during soft handover. But the number of radio links to be established between the mobile station and the base station becomes larger, while the mobile station is performing soft handover. In the inter-base-station soft handover, the mobile station established a plurality of radio links with a plurality of base stations. In the intra-base-station soft handover, the mobile station established a plurality of radio links with a base station.

Therefore, there is a problem that the received quality of the control data which is transmitted via an uplink and is received by the base station deteriorates, when the closed loop transmit diversity is used during soft handover. As a result, there is a case that the error of the control data is increased, and the base station cannot generate an optimal antenna weight. And, there is a case that the gain by the closed loop transmit diversity is decreased, because the number of the radio links is large.

Furthermore, since the transmission is performed by using a plurality of radio links, the received power per radio link which the mobile station receives is decreased. And, it becomes hard for the base station to estimate a BER (Bit Error Rate) of the control data, due to the deterioration of the received quality of the uplink. As a result, there is a case that an accuracy of the antenna verification which is performed by the mobile station deteriorates.

Because of the above deterioration factor, there is a possibility that the received quality deteriorates when the closed loop transmit diversity is applied during soft handover more than when the closed loop transmit diversity is not applied during soft handover. As a result, there is a possibility that a capacity of a downlink deteriorates. Such a problem is accentuated in the inter-base-station soft handover.

DISCLOSURE OF THE INVENTION

Accordingly, an object of the present invention is to improve the received quality in the mobile station, by using the transmit diversity adequately.

A first aspect of the present invention is summarized as a radio network controller including: a determination unit configure to determine a transmit diversity method to be used to transmit a signal from a base station to a mobile station, in accordance with a soft handover status of the mobile station; and an instruction unit configured to instruct the transmit diversity method to the base station, in accordance with the determination result by the determination unit.

A second aspect of the present invention is summarized as a base station including: a baseband signal process unit configured to generate a baseband signal, in accordance with a transmit diversity method based on a soft handover status of a mobile station; and a plurality of radio communication units configured to transmit to, the mobile station, a radio frequency signal which is obtained by performing a frequency conversion on the baseband signal.

A third aspect of the present invention is summarized as a mobile station including: a radio communication unit configured to receive a radio frequency signal which is transmitted from a base station by using a diversity; and a baseband signal process unit configure to decode a baseband signal which is obtained by performing a frequency conversion on the radio frequency signal, in accordance with a soft handover status of the mobile station.

A fourth aspect of the present invention is summarized as a mobile communication system including: a determination unit configured to determine a transmit diversity method to be used to transmit a signal from a base station to a mobile station, in accordance with a soft handover status of a mobile station; and a base station configured to generate a baseband signal, in accordance with the determination result by the determination unit, and to transmit, to the mobile station, a radio frequency signal which is obtained by performing a frequency conversion on the baseband signal.

A fifth aspect of the present invention is summarized as a radio communication method including: determining a transmit diversity method to be used to transmit a signal from a base station to a mobile station, in accordance with a soft handover status of a mobile station; generating a baseband signal, in accordance with the determination result; and transmitting, to the mobile station, a radio frequency signal which is obtained by performing a frequency conversion on the baseband signal.

BRIEF DESCRIPTION OF THE DRAWINGS

FIG. 9 is a diagram showing a procedure of a mobile communication method when soft handover stops according to one embodiment of the present invention.

FIG. 10 is a diagram showing a procedure of a mobile communication method when soft handover starts according to one embodiment of the present invention.

BEST MODES FOR CARRYING OUT THE INVENTION

Mobile Communication System

Figure 1:
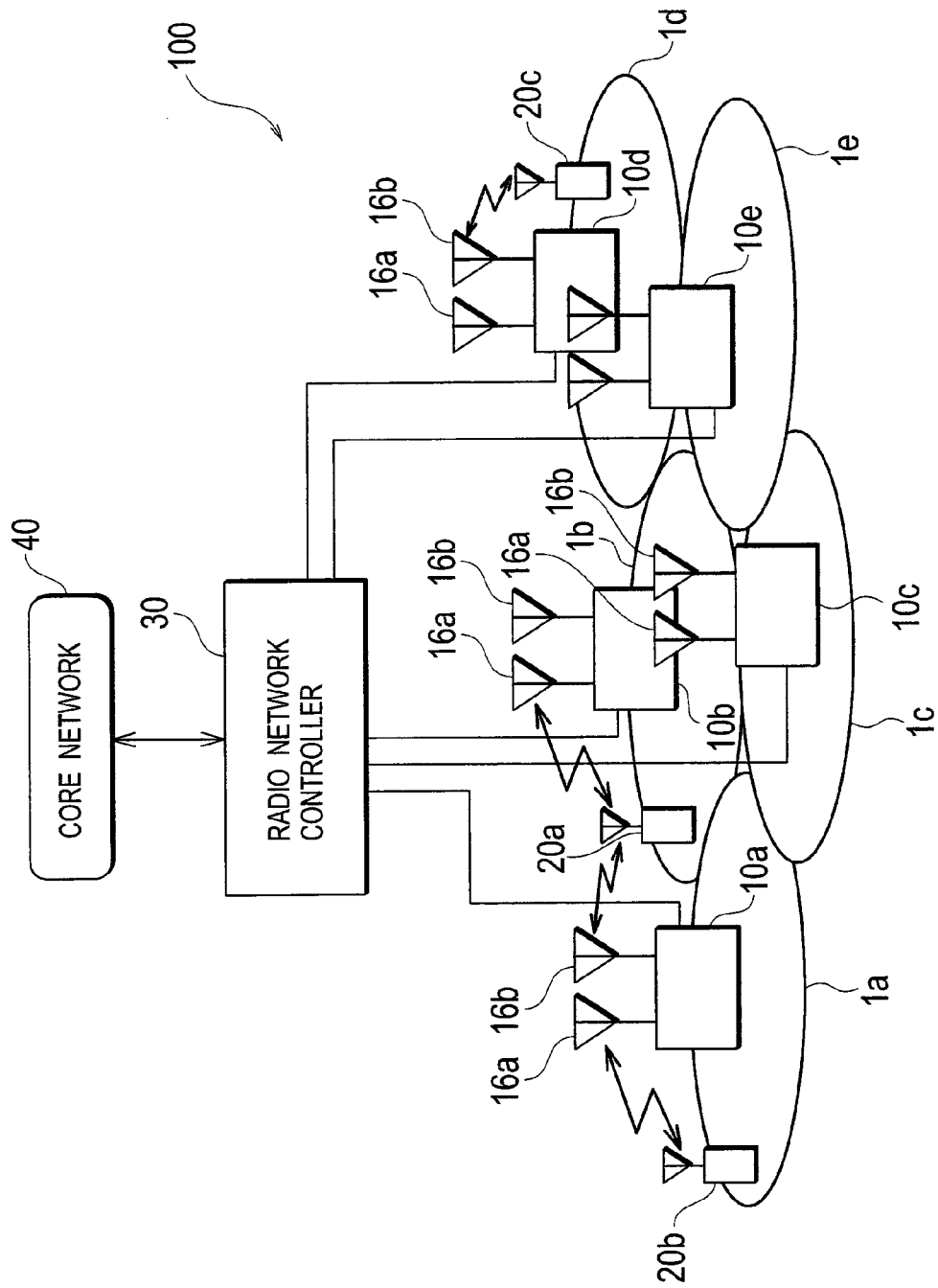
FIG. 1 is a diagram showing a configuration of a mobile communication system according to one embodiment of the present invention.

As shown in FIG. 1, a mobile communication system 100 includes a plurality of base station 10a, 10b, 10c, 10d and 10e, a plurality of mobile station 20a, 20b and 20c, a radio network controller 30, and a core network 40. The radio network controller 30 is an apparatus which is located in upper level of the base station 10a-10e, and is configured to control a radio communication between the base station 10a-10e and the mobile station 20a-20c which is performed by establishing radio links. The radio network controller 30 is configured to connect the base station 10a-10e with the core network 40. And, the radio network controller 30 is configured to communicate with the mobile station 20a-20c via the base station 10a-10e.

In the mobile communication system 100, a radio area is divided into a plurality of cell units. Each base station 10a-10e covers the cell 1a-1e respectively, and is configured to establish a radio link with a mobile station which is located in the its own cell. And, each base station 10a-10e includes a plurality of antenna 16a and 16b, and can apply the transmit diversity.

Figure 2:
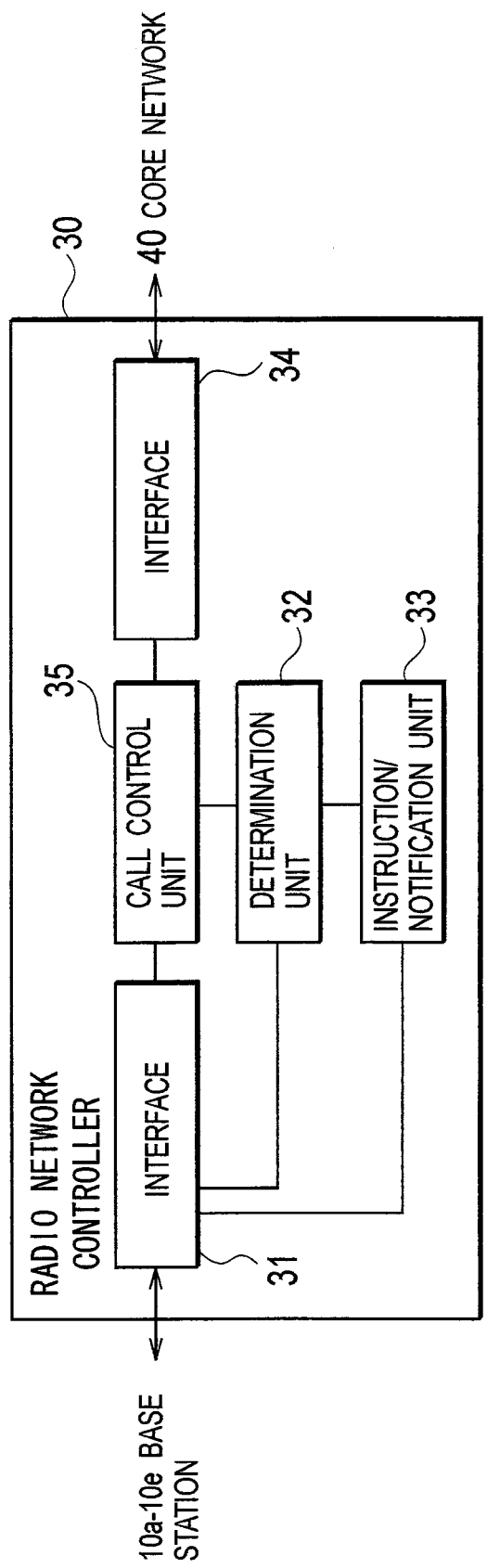
FIG. 2 is a block diagram showing a configuration of a radio network controller of the mobile communication system according to one embodiment of the present invention.

Next, referring to FIG. 2, the radio network controller 30 will be explained in greater details. As shown in FIG. 2, the radio network controller 30 includes an interface 31 with the base station 10a-10e, an interface 34 with the core network 40, a determination unit 32, an instruction/notification unit 33, and a call control unit 35.

The determination unit 32 is configured to determine a transmit diversity method to be used to transmit a signal from a base station to a mobile station, in accordance with a soft handover status of the mobile station.

To be more specific, the determination unit 32 can determine that the transmit diversity method to be used is an open loop transmit diversity, when the mobile station is during soft handover. On the other hand, the determination unit 32 can determine that the transmit diversity method to be used is a closed loop transmit diversity, when the mobile station is not during soft handover.

The soft handover shows that the mobile station establishes a plurality of radio links with at least one base stations. In the mobile communication system 100, the radio area is divided into a plurality of cell units. Therefore, the mobile station 20a-20c connects a plurality of base stations, and performs inter-base-station soft handover for establishing radio links with different base stations. As a result, the determination unit 32 can determine the transmit diversity method to be used, in accordance with the number of the base stations with which the mobile station communicates simultaneously.

For example, in FIG. 1, the mobile station 20a, which is located in the vicinity of a border between the cell 1a covered by the base station 10a and the cell 1b covered by the base station 10b, connects and establishes radio links with both the base station 10a and the base station 10b. In other words, the mobile station 20a is during the inter-base-station soft handover. Therefore, the determination unit 32 can determine that the transmit diversity method to be used is the open loop transmit diversity.

On the other hand, the mobile station 20c, which is located in the vicinity of the center of the cell 1d covered by the base station 10d, connects with only the base station 10d and establishes one radio link with the base station 10d. In other hands, the mobile station 20c is not during soft handover. Therefore, the determination unit 32 can determine that the transmit diversity method to be used is the closed loop transmit diversity. It is note that the mobile station 20a-20c can establish radio links with more than three base stations. In this way, the determination unit 32 can determine to use the closed loop transmit diversity when the number of base stations with which the mobile station communicates simultaneously is one, and to use the open loop transmit diversity when the number of base stations with which the mobile station communicates simultaneously is equal to or larger than two.

The determination unit 32 can judge the soft handover status, in accordance with a received power difference of radio frequency signals (hereinafter called "RF signal") from the base station in the mobile station for judging whether or not to perform soft handover, and a threshold of the received power difference.

The determination unit 32 can set a value as the threshold of the received power difference, so as to judge that the soft handover should be stopped when the received power difference exceeds the threshold, and that the soft handover should be started when the received power difference becomes equal to or smaller than the threshold.

For example, the determination unit 32 can obtain a notification from the mobile station 20a-20c, via the interface 31 and the base station. The determination unit 32 can obtain a notification showing that the received power difference exceeds the threshold and the base station whose received power is the lowest. And, the determination unit 32 can obtain a notification showing that the received power difference becomes equal to or smaller than the threshold and the base station receiving an RF signal which is received by the mobile station.

Figure 3:
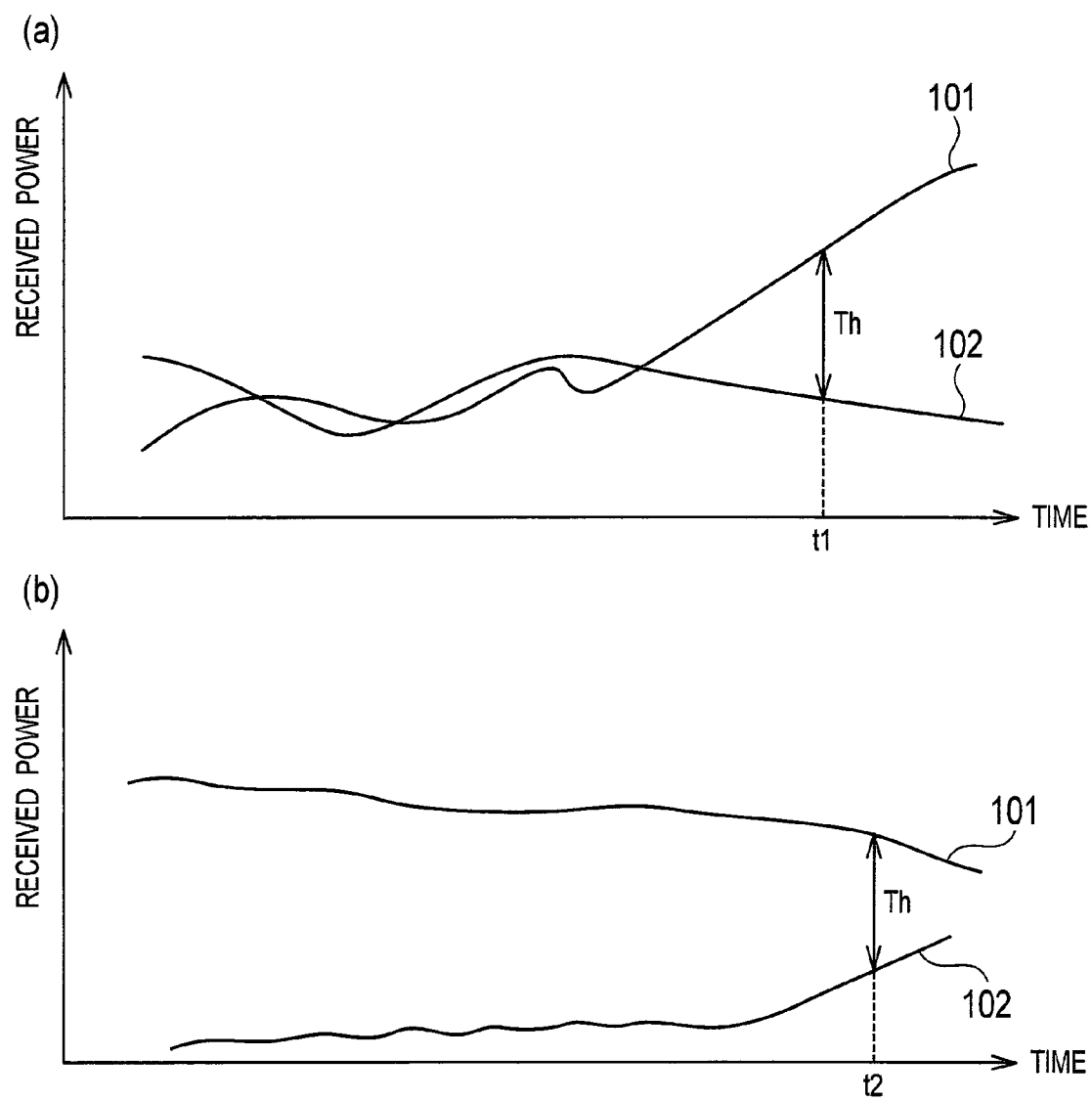
FIG. 3 is a graph diagram showing a change of received powers according to one embodiment of the present invention.

As shown in FIG. 3, an example of a case that the mobile station 20a receives RF signals from the base station 10a and the base station 10b will be described as follows. In FIG. 3, the vertical axis shows the received power of the mobile station 20a, and the horizontal axis shows the time.

For example, as shown in FIG. 3(a), the determination unit 32 receives the notification showing that the received power difference exceeds the threshold, when the received power 101 of the RF signal which the mobile station 20a receives from the base station 10a is increased, the received power 102 of the RF signal which the mobile station 20a receives from the base station 10b is decreased, as a result, the difference between the received power 101 and the received power 102 exceeds the threshold Th. In this case, the determination unit 32 judges that the soft handover should be stopped.

And, the determination unit 32 determines to release the radio link between the mobile station 20a and the base station 10b whose received power is low. Moreover, since the soft handover status is changed to the status that the mobile station is not during soft handover, the determination unit 32 determines that the transmit diversity method to be used is the closed loop transmit diversity.

On the other hand, as shown in FIG. 3(b), the determination unit 32 receives the notification showing that the received power difference becomes equal to or smaller than the threshold, when the received power 102 of the RF signal which the mobile station 20a receives from the base station 10b is increased, as a result, the difference between the received power 101 and the received power 102 becomes equal to or smaller than the threshold Th. In this case, the determination unit 32 judges that the soft handover should be started. The determination unit 32 determines to establish radio links between the mobile station 20a and the plurality of base stations 10a and 10b transmitting an RF signal which is received by the mobile station 20a. Moreover, since the soft handover status is changed to the status that the mobile station is during soft handover, the determination unit 32 determines that the transmit diversity method to be used is the open loop transmit diversity.

In this way, the determination unit 32 can change the transmit diversity method, with following the change of the number of base stations with which the mobile stations 20a-20c communicate simultaneously. To be more specific, the determination unit 32 can change the transmit diversity method to be used to the open loop transmit diversity, when the number of base stations with which the mobile stations 20a-20c connects simultaneously is changed from one to plural number. The determination unit 32 can change the transmit diversity method to be used to the closed loop transmit diversity, when the number of base stations with which the mobile stations 20a-20c connects simultaneously is changed from plural number to one. It is noted that the determination unit 32 determines a timing at which the mobile stations 20a-20c and the base station 10a-10e change the transmit diversity method to be used.

The determination unit 32 may be configured to obtain a notification of the received quality difference, a notification of the received quality from the mobile stations 20a-20c, instead of a relationship between the threshold of the received quality difference and the actual received quality difference. The determination unit 32 can judge the soft handover status and determine the transmit diversity method to be used, by comparing the threshold of the received quality difference with the obtained received quality difference, when obtaining the notification of the received quality difference. And, the determination unit 32 can judge the soft handover status and determine the transmit diversity method to be used, by calculating the received quality difference and comparing the threshold of the received quality difference with the calculated received quality difference, when obtaining the notification of the received quality. For example, the determination unit 32 can perform the judgment, by using the received quality difference of RF signals transmitted from the base stations 10a-10e to the mobile stations 20a-20c via common pilot channels.

According to this configuration, the radio network controller 30 can adequately judge the soft handover status, in accordance with the received quality difference in the mobile stations 20a-20c, and make the base stations 10a-10e use the optimal transmit diversity method. The determination unit 32 inputs the determination result to the instruction/notification unit 33.

The instruction/notification unit 33 functions as an instruction unit configured to instruct the transmission method to be used to the base station, in accordance with the determination result by the determination unit 32. The instruction/notification unit 33 is configured to generate control data including the instruction, and to transmit the generated control data to the base stations 10a-10e via the interface 31.

When the determination result shows a release of a radio link and a use of a closed loop transmit diversity, the instruction/notification unit 33 instructs a target base station to release the radio link by specifying the mobile station which should release the radio link. Furthermore, the instruction/notification unit 33 instructs a target base station which should maintain the radio link to change the transmit diversity method to be used to the closed loop transmit diversity.

On the other hand, when the determination result shows an establishment of a radio link and a use of an open loop transmit diversity, the instruction/notification unit 33 instructs a target base station to establish a new radio link by specifying the mobile station which should establish the new radio link, and to use the open loop transmit diversity. And, the instruction/notification unit 33 instructs the base station which has already established the radio link to change the transmit diversity method to be used to the open loop transmit diversity. The instruction/notification unit 33 instructs, to the base station, a timing at which the transmit diversity method to be used should be changed.

Moreover, the instruction/notification unit 33 functions as a notification unit configured to notify the transmit diversity method to be used to the mobile station, in accordance with the determination result by the determination unit 32. The instruction/notification unit 33 is configured to generate control data including the notification, and to transmit the generated notification to the mobile stations 20a-20c via the interface 31 and the base station 10a-10c.

When the determination result shows a release of a radio link and a use of a closed loop transmit diversity, the instruction/notification unit 33 notifies the target base station which should release the radio link and a change to the closed loop transmit diversity. On the other hand, when the determination result shows an establishment of a radio link and a use of an open loop transmit diversity, the instruction/notification unit 33 notifies the target base station which should establish the new radio link and a change to the open loop transmit diversity. The instruction/notification unit 33 notifies, to the base station, a timing at which the transmit diversity method to be used should be changed.

The call control unit 35 is configured to perform a call control. The call control unit 35 is configured to transmit control data related to the call control, to the base station 10a-10e via interface 31. And, the call control unit 35 is configured to obtain user data which is transmitted from the mobile stations 20a-20c via an uplink, from the base stations 10a-10e via the interface 31, and to transfer the user data to the core network 40 via the interface 34. The call control unit 35 is configured to obtain user data to be transmitted to the mobile stations 20a-20c via a downlink, from the core network 40 via the interface 34, and to transfer the user data to the base stations 10a-10e via the interface 31.

Figure 4:
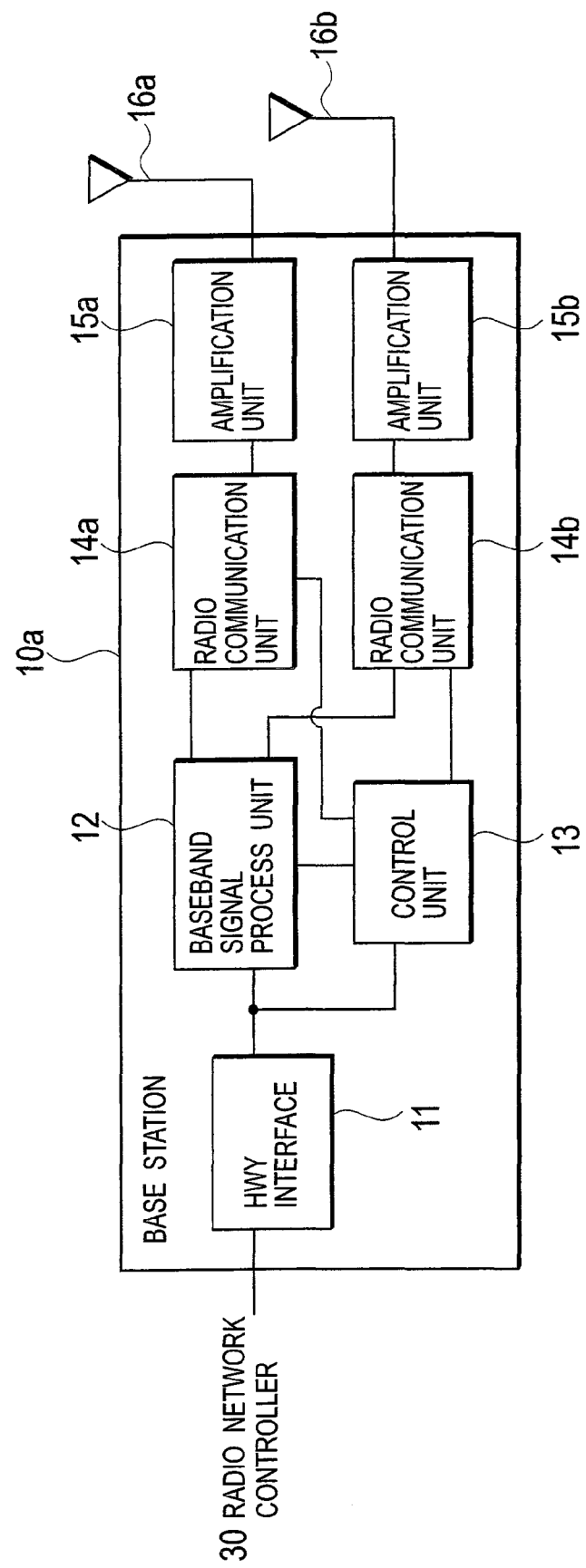
FIG. 4 is a block diagram showing a configuration of a base station of the mobile communication system according to one embodiment of the present invention.

Next, referring to FIG. 4, the base stations 10a-10e will be explained in greater details. As shown in FIG. 4, the base station 10a includes an HWY interface 11 with the radio network controller 30, a baseband signal process unit 12, a control unit 13, a plurality of radio communication units 14a and 14b, a plurality of amplification units 15a and 15b, and a plurality of antennas 16a and 16b. It is noted that the base stations 10b-10e has a similar configuration as the base station 10a substantially.

The control unit 13 is configured to control the baseband signal process unit 12 and the radio communication units 14a and 14b. The control unit 13 is configured to control data including the instruction, from the radio network controller 30 via the HWY interface 11. The control unit 13 is configured to instruct the radio communication units 14a and 14b to establish and release a radio link with the mobile station, in accordance with an instruction of an establishment and a release of the radio link.

The control unit 13 is configured to instruct the baseband signal process unit 12 to generate a baseband signal by using the instructed transmit diversity method, in accordance with the instruction of the transmit diversity method to be used. The control unit 13 is configured to also instruct, to the baseband signal process unit 12, a timing at which the transmit diversity method to be used should be changed. In addition, the control unit 13 is configured to perform a call control, an allocation of radio resources to the mobile stations 20a-20c and the like.

The baseband signal process unit 12 is configured to perform a signal process regarding a baseband signal. The baseband signal process unit 12 is configured to obtain user data and control data to be transmitted to the mobile stations 20a-20c via an uplink, from the HWY interface 11 and the control unit 13.

The baseband signal process unit 12 is configured to generate a baseband signal including the obtained user data and the obtained control data. The baseband signal process unit 12 is configured to generate a baseband signal to be transmitted via each antenna 16a and 16b, and to input the baseband signal to the radio communication unit 14a and 14b respectively.

To be more specific, the baseband signal process unit 12 is configured to generate the baseband signal, by performing an error correction coding, a spreading process and the like, for data to be transmitted via a downlink.

And, the baseband signal process unit 12 is configured to obtain the baseband signal received from the mobile stations 20a-20c via an uplink, from the radio communication unit 14a and 14b. The baseband signal process unit 12 is configured to extract the user data and the control data, from the obtained baseband signal, and to input the extracted user data and the extracted control data, to the HWY interface 11 and the control unit 13.

To be more specific, the baseband signal process unit 12 is configured to obtain the data, by performing a despreading process, an RAKE combining, decoding and the like, for the baseband signal received via the uplink.

The baseband signal process unit 12 is configured to generate a baseband signal, in accordance with the transmit diversity method based on the soft handover status of the mobile station, when generating the baseband signal. The baseband signal process unit 12 is configured to receive, from the control unit 13, an instruction to use the transmit diversity method which is instructed by the radio network controller 30, and generate the baseband signal in accordance with the instruction.

The baseband signal process unit 12 is configured to change the transmit diversity method of the baseband signal to be generated in accordance with the instruction, when being instructed to change the transmit diversity method. The baseband signal process unit 12 is configured to change the transmit diversity method of the baseband signal to be generated, at the instructed timing.

In this way, the baseband signal process unit 12 can be configured to change the transmit diversity method to be used for generating the baseband signal, to the open loop transmit diversity, when the number of base stations with which the mobile station connects simultaneously changes from one to plural number. The baseband signal process unit 12 can be configured to change the transmit diversity method to be used for generating the baseband signal, to the closed loop transmit diversity, when the number of base stations with which the mobile station connects simultaneously changes from plural number to one.

The baseband signal process unit 12 includes a configuration for performing the open loop transmit diversity and a configuration for performing the closed loop transmit diversity. To be more specific, the baseband signal process unit 12 includes an STTD encoder 121 for performing the open loop transmit diversity as shown in FIG. 5(a), an FBI decoder 122 for performing the closed loop transmit diversity as shown in FIG. 5(b), and a plurality of multipliers 123a and 123b.

First, as shown in FIG. 5(a), a process of the baseband signal process unit 12 when being instructed to perform the open loop transmit diversity will be explained. Here, an example of case that the STTD (Space Time block coding based Transmit antenna Diversity) is used as the open loop transmit diversity will explained. The STTD performs a symbol conversion which converts a symbol pattern of any one of antennas by using the predetermined method, so as to transmit RF signals having different symbol patterns for each antenna 16a and 16b.

For example, the STTD encoder 121 obtains a complex signal of data to be transmitted via a downlink dedicated channel and a downlink common channel. To be more specific, the STTD encoder 121 obtains a complex signal of a symbol pattern "$S_1, S_2, \ldots$".

The STTD encoder 121 calculates a complex conjugation of an odd symbol $S_1$ of the obtained symbol pattern, and obtains $S_1^*$. The STTD encoder 121 calculates a complex conjugation of an even symbol $S_2$, multiplies the calculated complex conjugation by $-1$, and obtains $-S_2^*$. Further, the STTD encoder 121 alternates the calculated odd symbol $S_1^*$ with the calculated even symbol $-S_2^*$ in the time direction, and obtains a symbol pattern "$-S_2^*, S_1^*, \ldots$". The STTD encoder 121 regards the symbol pattern "$-S_2^*, S_1^*, \ldots$", as a symbol pattern for a baseband signal of the antenna 16b.

And, the baseband signal process unit 12 regards an untouched symbol pattern "$S_1, S_2, \ldots$" on which the symbol conversion is not performed, as a symbol pattern for a baseband signal of the antenna 16a. Further, the baseband signal process unit 12 performs a spreading process on the complex signals of different symbol patterns for each antenna 16a and 16b, and generates a baseband signals of different symbol patterns for each antenna 16a and 16b.

Next, as shown in FIG. 5(b), a process of the baseband signal process unit 12 when being instructed to perform the closed loop transmit diversity will be explained. In the closed loop transmit diversity, a base station controls an amplitude and phase of transmission signal of each antenna 16a and 16b, in accordance with control data of an FBI (Feed Back Indicator) transmitted form a mobile station. The FBI indicates an antenna weight which the mobile station has determined so that an amplitude and a phase of transmission signals from each antenna 16a and 16b becomes an optimal pattern (so that a high gain can be obtained by a signal combining).

Figure 6:
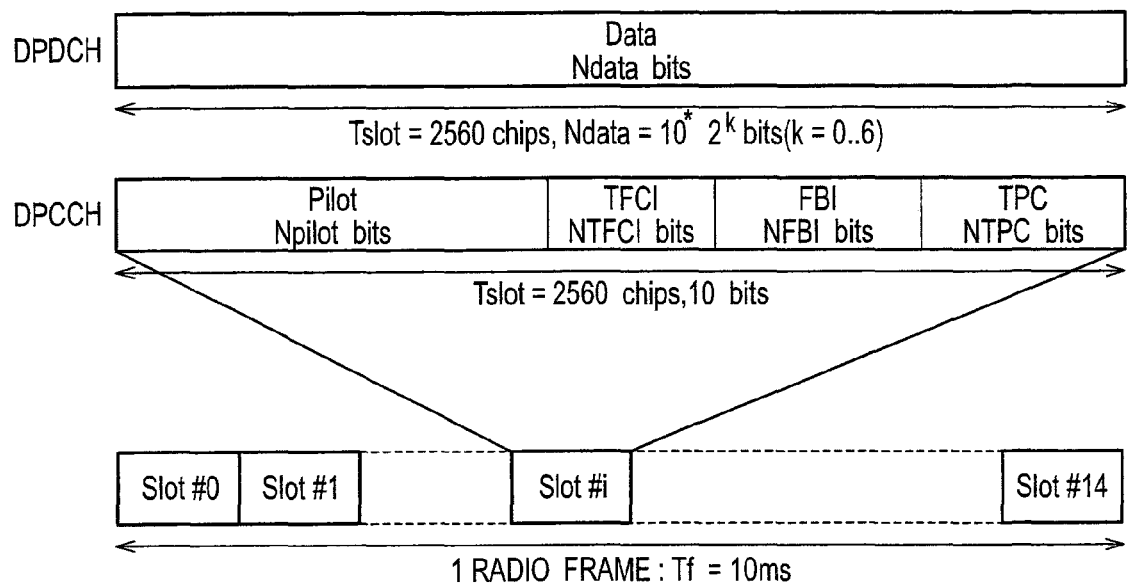
FIG. 6 is a diagram showing a radio frame and a dedicated channel according to one embodiment of the present invention.

The FBI decoder 122 obtains the FBI, which is transmitted from the mobile station via an uplink dedicated channel, via the radio communication units 14a and 14b. To be more specific, as shown in FIG. 6, one radio frame is formed by fifteen time slots. The dedicated channel includes a Dedicated Physical Data Channel (DPDCH) for transmitting user data, and a Dedicated Physical Control Channel (DPCCH) for transmitting control data. The FBI is transmitted by using FBI bits which are allocated to the Dedicated Physical Control Channel (DPCCH).

The antenna weight includes $W_1$ multiplied to a baseband signal which forms a foundation of an RF signal to be transmitted by the antenna 16a, and $W_2$ multiplied to a baseband signal which forms a foundation of an RF signal to be transmitted by the antenna 16b. The antenna weight is represented by the following expression (1).

$$(W_1, W_2) = \{1, \exp(j\phi)\} \qquad \text{expression (1)}$$

In this regard, $\phi \in \{1/4\pi, 3/4\pi, 5/4\pi, 7/4\pi\}$

Figure 7:
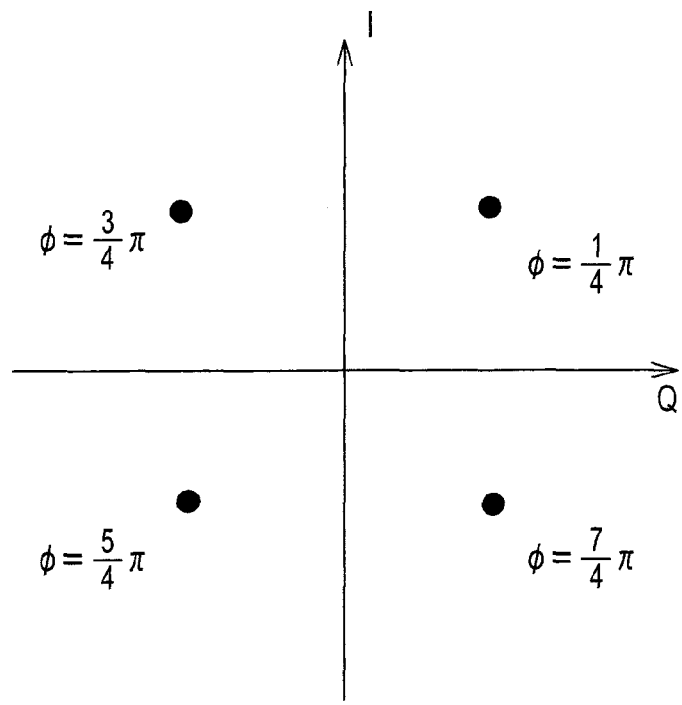
FIG. 7 is a diagram showing a pattern of an antenna weight according to one embodiment of the present invention.

Therefore, as shown in FIG. 7, a pattern of the antenna weight $W_2$ is represented in the phase plane. As a result, a received signal r in the mobile station is represented by the following expression (2). In the expression (2), $\alpha_1$ and $\alpha_2$ are fading vectors in a propagation path from each antenna 16a and 16b to the mobile station, and S is a symbol.

$$r = (\alpha_1 W_1 + \alpha_2 W_2) S \qquad \text{expression (2)}$$

As shown in the expression (1), the antenna weight $W_1$ is fixed to "1". Therefore, the FBI indicates $W_2$ which is determined so as to maximize $\alpha_1 W_1 + \alpha_2 W_2$. To be more specific, the FBI bits of the odd time slots indicate the positive and negative of the I-axis component of $W_2$, the FBI bits of the even time slots indicate the positive and negative of the Q-axis component of $W_2$.

The FBI decoder 122 is configured to judge the obtained FBI. To be more specific, the FBI decoder 122 is configured to judge the I-axis component and the Q-axis component, from the FBI. The FBI decoder 122 is configured to generate the antenna weights $W_1$ and $W_2$, in accordance with the judgment result. The FBI decoder 122 is configured to input the generated antenna weights $W_1$ and $W_2$ to the multiplier 123a and 123b, respectively.

For example, the multiplier 123a and 123b are configured to obtain a complex signal of data to be transmitted by using a downlink dedicated channel. The multiplier 123a and 123b are configured to obtain the complex signal of a symbol pattern "$S_1, S_2,$", respectively. The multiplier 123a is configured to generate a symbol pattern "$W_1 S_1, W_1 S_2, \ldots$", by multiplying the symbol pattern "$S_1, S_2, \ldots$" by the obtained antenna weight $W_1$. The multiplier 123b is configured to generate a symbol pattern "$W_2 S_1, W_2 S_2, \ldots$", by multiplying the symbol pattern "$S_1, S_2, \ldots$" by the obtained antenna weight $W_2$.

And, the baseband signal process unit 12 performs a spreading process on a complex signals, and generates baseband signals having different phases and amplitudes for each antenna 16a and 16b. Here, different antenna weights are multiplied to the complex signals, so that the complex signals have different phases and amplitudes. By this closed loop transmit diversity, it is possible to sequentially change the phases and the amplitudes of the transmission signals of each antenna 16a and 16b, in accordance with an instruction from the mobile station, and to obtain a gain by a signal combining.

The baseband signal process unit 12 inputs the baseband signal of each antenna 16a and 16b generated like this, to the radio communication units 14a and 14b, respectively.

The radio communication units 14a and 14b are configured to obtain baseband signals to be transmitted by using each antenna 16a and 16b, and to perform a frequency conversion to RF signals of a radio frequency. The radio communication units 14a and 14b are configured to input the converted RF signals to the amplification units 15a and 15b, and to transmit the RF signals to a mobile station via the amplification units 15a and 15b and the antennas 16a and 16b. In this way, the base station 10a includes a plurality of radio communication units configured to transmit, to the mobile station, the RF signals which are obtained by performing the frequency conversion on the baseband signals. And, the radio communication units 14a and 14b are configured to obtain the RF signals received from the amplification units 15a and 15b, and to perform the frequency conversion on the RF signals so as to obtain the baseband signals. The radio communication units 14a and 14b are configured to input the converted baseband signals to the baseband signal process unit 12.

The amplification units 15a and 15b are configured to obtain the RF signals from the radio communication units 14a and 14b, and to amplify the RF signals so as to input the amplified RF signals to the antennas 16a and 16b. The amplification units 15a and 15b are configured to obtain the RF signals from the antennas 16a and 16b, and to amplify the RF signals so as to input the amplified RF signals to the radio communication units 14a and 14b.

The antennas 16a and 16b are configured to obtain the amplified RF signals of the downlink from the amplification units 15a and 15b, and to transmit the RF signals to the mobile station. The antennas 16a and 16b are configured to obtain RF signals of the uplink from the mobile station, and to input the RF signals to the amplification units 15a and 15b.

In this way, the base station 10a includes a plurality of amplifiers configured to amplify the RF signals, a plurality of antennas configured to transmit the RF signals amplified by the plurality of amplifiers, and a plurality of radio communication units. In the other words, the base station 10a includes a plurality of transmission systems, and can apply the transmit diversity.

As above explained, the mobile communication system 100 includes a determination unit 32 configured to determine the transmit diversity method to be used to transmit a signal from a base station to a mobile station, in accordance with the soft handover status of the mobile station, and base stations 10a-10e configured to generate a baseband signal in accordance with the determination result by the determination unit 32, and to transmit, to the mobile station, an RF signal which is obtained by performing a frequency conversion on the baseband signal.

Figure 8:
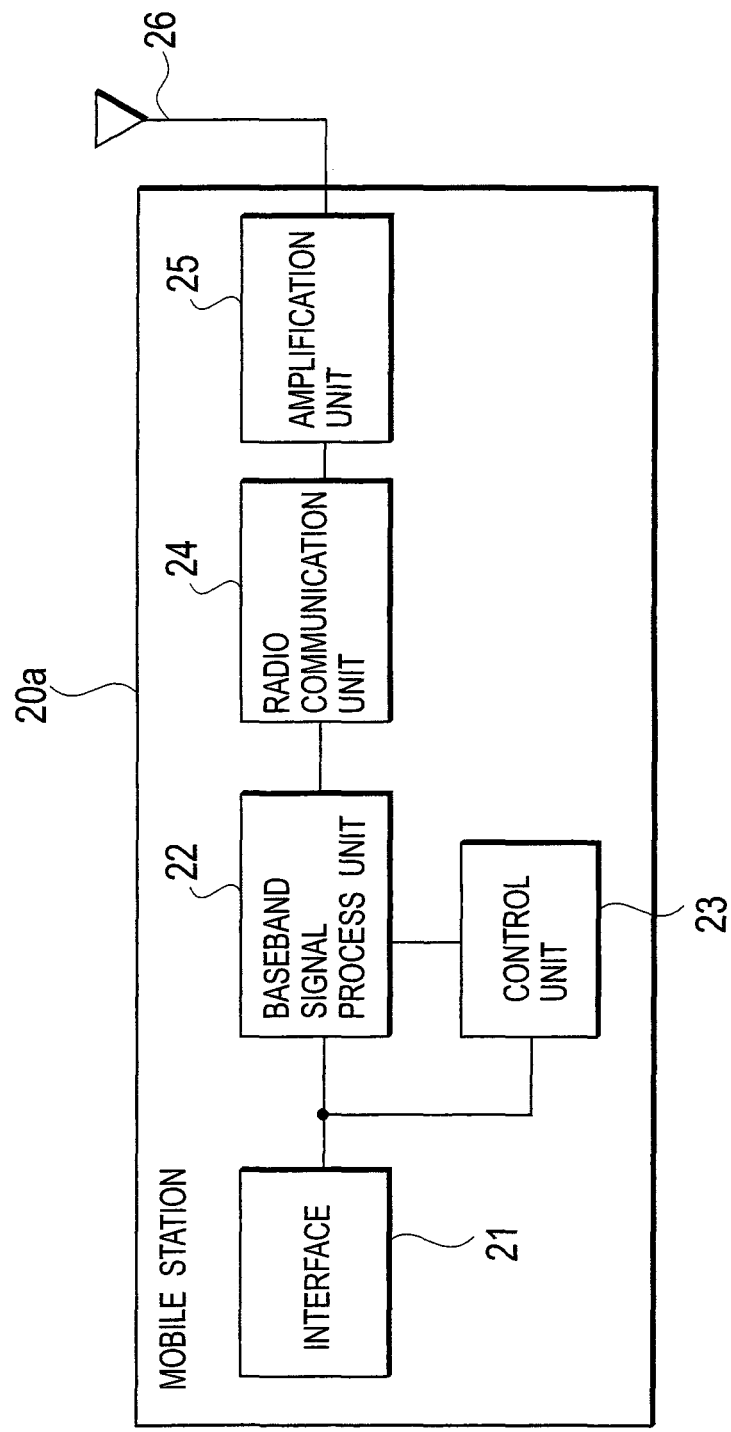
FIG. 8 is a block diagram showing a configuration of a mobile station of the mobile communication system according to one embodiment of the present invention.

Next, referring to FIG. 8, the mobile stations 20a-20c will be explained in greater details. As shown in FIG. 8, the mobile station 20a includes an interface 21, a baseband signal process unit 22, a control unit 23, a radio communication unit 24, an amplification unit 25, and an antenna 26. It is noted that the mobile stations 20*b*-20*c* has a similar configuration as the mobile station 20*a* substantially.

The antenna 26 is configured to receive an RF signal of a downlink from the base station, and to input the received RF signal to the amplification unit 25. The antenna 26 is configured to obtain the an RF signal of an uplink amplified by the amplification unit 25, and to transmit the amplified RF signal to the base station. The amplification unit 25 is configured to obtain the RF signal received by the antenna 26, and to amplify the RF signal so as to input the amplified RF signal to the radio communication unit 24. The amplification unit 25 is configured to obtain, from the radio communication unit 24, the RF signal to be transmitted, and to amplify the obtained RF signal so as to input the amplified RF signal to the antenna 26.

The radio communication unit 24 is configured to obtain the RF signal received by the amplification unit 25, and to perform a frequency conversion on the obtained RF signal so as to obtain a baseband signal. The radio communication unit 24 is configured to input the converted baseband signal to the baseband signal process unit 22. In this way, the radio communication unit 24 is configured to receive the RF signal which is diversity-transmitted from the base station via the antenna 26 and the amplification unit 25 by applying the transmit diversity. The radio communication unit 24 is configured to obtain, from the baseband signal process unit 22, the baseband signal to be transmitted, and to perform a frequency conversion on the obtained baseband signal so as to obtain an RF signal of a radio frequency. The radio communication unit 24 is configured to input the converted RF signal to the amplification unit 25.

The control unit 23 is configured to control the baseband signal process unit 22 and the radio communication unit 24. The control unit 23 is configured to obtain control data including a notification, from the radio network controller 30 via the base station and the radio communication unit 24. The control unit 23 is configured to instruct the radio communication unit 24 to establish or release a radio link with the base station, in accordance with a notification of establishment or release of the radio link. The control unit 23 is configured to instruct the baseband signal process unit 22 to decode a baseband signal based on a notified transmit diversity method, in accordance with a notification of a transmit diversity method. The control unit 23 is also configured to instruct, to the baseband signal process unit 22, a timing at which the transmit diversity method is changed.

And, the control unit 23 is configured to judge a relationship between a received power difference of signals received by the radio communication unit 24 from each base station and a threshold of the received power difference, and to notify the judgment result to the radio network controller 30. To be more specific, the control unit 23 is configured to notify that the received power difference exceeds the threshold and the base station whose received power is low, or to notify that the received power difference becomes equal to or smaller than the threshold and the base station transmitting an RF signal which the mobile station receives.

To be more specific, the control unit 23 is configured to monitor the radio communication unit 24, and to detect the received powers from each base station. The control unit 23 is configured to calculate the received power difference from each base station, and to compare the calculated received power difference with the threshold. The control unit 23 is configured to generate control data including a notification showing that the received power difference exceeds the threshold and the base station whose received power is low, when the actual received power difference exceeds the threshold. The control unit 23 is configured to transmit the generated control data to the radio network controller 30 via the radio communication unit 24 and the base station.

Or, the control unit 23 is configured to generate control data including a notification showing that the received power difference becomes equal to or smaller than the threshold and the base station transmitting an RF signal which the mobile station receives, when the actual received power difference becomes equal to or smaller than the threshold. The control unit 23 is configured to transmit the generated control data to the radio network controller 30 via the radio communication unit 24 and the base station.

Or, the control unit 23 may be configured to notify, to the radio network controller 30, the received power difference or the received powers from each mobile station themselves. In this case, for example, the control unit 23 can be configured to notify regularly or in response to a request from the radio network controller 30. In addition, the control unit 23 is configured to perform a call control and the like.

The baseband signal process unit 22 is configured to perform a signal process regarding a baseband signal. The baseband signal process unit 22 is configured to obtain a baseband signal received from the base station via a downlink, from the radio communication unit 24. The baseband signal process unit 22 is configured to extract user data and control data from the obtained baseband signal, and input the extracted user data and the extracted control data to the interface 21 and the control unit 23. To be more specific, the baseband signal process unit 22 is configured to obtain data by performing a despreading process, an RAKE combining, decoding and the like for the baseband signal received via the downlink.

The baseband signal process unit 22 is configured to obtain user data and control data to be transmitted to the base station via the uplink, from the interface 21 and the control unit 23. The interface 21 is an interface with an input unit, an output unit, an external device and the like. The baseband signal process unit 22 is configured to generate a baseband signal including the obtained user data and the obtained control data. The baseband signal process unit 22 is configured to input the generated baseband signal to the radio communication unit 24. To be more specific, the baseband signal process unit 22 is configured to generate the baseband signal, by performing an error correction coding, a spreading process and the like for data to be transmitted via the uplink.

The baseband signal process unit 22 is configured to decode the baseband signal in accordance with the transmit diversity method based on a soft handover status of the mobile station 20*a*, when decoding the baseband signal which is obtained by performing a frequency conversion on an RF signal. The baseband signal process unit 22 is configured to receive, from the control unit 23, an instruction to decode the baseband signal in accordance with the transmit diversity method notified from the radio network controller 30, and to decode the baseband signal in accordance with the instruction.

When the notified transmit diversity method is changed, the baseband signal process unit 22 is configured to change the transmit diversity method for decoding the baseband signal in accordance with the instruction. The baseband signal process unit 22 is configured to change the transmit diversity method to be used for decoding, at the instructed timing. In this way, the mobile station change the transmit diversity method to be used for decoding, along with the change of the number of base stations with which the mobile station communicates simultaneously. To be more specific, when the number of base stations with which the mobile station connects simultaneously is changed from one to plural number, the mobile station changes the transmit diversity method to the open loop transmit diversity so as to perform the decoding. When the number of base stations with which the mobile station connects simultaneously is changed from plural number to one, the mobile station changes the transmit diversity method to the closed loop transmit diversity so as to perform the decoding.

The baseband signal process unit 22 includes a configuration for performing the decoding, in accordance with the open loop transmit diversity, and a configuration for performing the decoding, the decision of the antenna weight, the instruction, in accordance with the closed loop transmit diversity. To be more specific, the baseband signal process unit 22 includes an STTD decoder 221 for performing the open loop transmit diversity as shown in FIG. 5($a$), a data decoder 222 for performing the closed loop transmit diversity as shown in FIG. 5($b$), and a weight selection unit 223.

Figure 5:
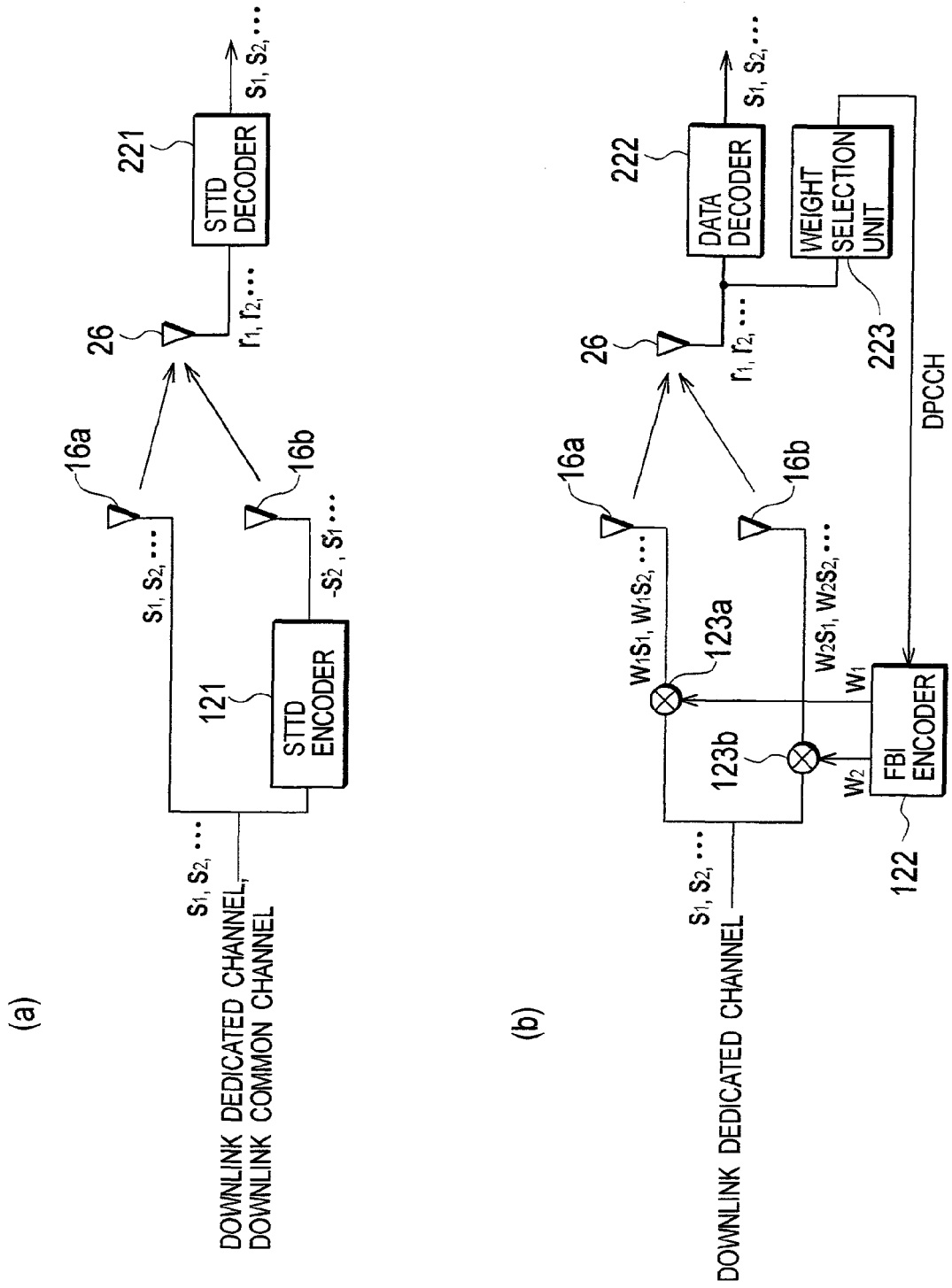
FIG. 5 is a diagram for explaining a configuration required for an open loop transmit diversity and a closed loop transmit diversity according to one embodiment of the present invention.

First, as shown in FIG. 5($a$), a process of the baseband signal process unit 22 when being instructed to perform the open loop transmit diversity will be explained. A symbol pattern "$r_1, r_2, \ldots$" received by the mobile station when the antennas 16$a$ and 16$b$ of the base station transmit symbol patterns "$S_1, S_2, \ldots$" and "$-S_2^*, S_1^*, \ldots$" respectively, is represented by the following expression (3). Here, for the simplicity, in the expression (3), a noise component is ignored. In the expression (3), $\alpha_1$ and $\alpha_2$ are fading vectors in a propagation path from each antenna 16$a$ and 16$b$ to the mobile station.

$$r_1 = (\alpha_1 S_1 - \alpha_2 S_2)$$

$$r_2 = (\alpha_1 S_2 - \alpha_2 S_1) \quad \text{expression (3)}$$

The baseband signal process unit 22 is configured to perform a spreading process and an RAKE combining on the received baseband signal. The signal after the RAKE combining is inputted to the STTD decoder 221. The STTD decoder 221 performs a decoding on the obtained signal with using the following expression (4). To be more specific, the STTD decoder 221 performs a maximum ratio combining on the fading vectors $\alpha_1$ and $\alpha_2$ for each symbol $S_1$ and $S_2$, obtains an output ($S_1$) and an output ($S_2$). In this way, the mobile station 20$a$ receives RF signals transmitted from a plurality of antennas 16$a$ and 16$b$, and performs the maximum ratio combining on the RF signals.

$$\text{output}(S_1) = \alpha_1^* r_1 + \alpha_2 r_2^* = (|\alpha_1|^2 + |\alpha_2|^2) S_1$$

$$\text{output}(S_2) = \alpha_2^* r_2 - \alpha_1 r_1^* = (|\alpha_1|^2 + |\alpha_2|^2) S_2 \quad \text{expression (4)}$$

Next, as shown in FIG. 5($b$), a process of the baseband signal process unit 22 when being instructed to perform the closed loop transmit diversity will be explained. The signal after the RAKE combining is inputted to the data decoder 222. A signal "r" received by the mobile station when the antennas 16$a$ and 16$b$ of the base station transmit symbol patterns "$W_1 S$" and "$W_2 S$" respectively, is represented by the above expression (2).

Therefore, the data decoder 222 performs the decoding with using the following expression (5). To be more specific, the data decoder 222 performs a signal combining by calculating the expression (5), so as to obtain a gain (a beam forming gain) for adjusting the phase. Here, for the simplicity, in the expression (5), the noise component is ignored.

$$\text{output}(S) = (\alpha_1 W_1 + \alpha_2 W_2) r = |\alpha_1 W_1 + \alpha_2 W_2|^2 S_1 \quad \text{expression (5)}$$

Moreover, the weight selection unit 223 is configured to perform a decision of antenna weights to be notified to the base station, and a generation of the FBI. The weight selection unit 223 is configured to determine, based on the received signal, the antenna weights, so that amplitudes and phases of transmission signal from each antenna 16$a$ and 16$b$ are an optimal patterns (so that a high gain can be obtained by a signal combining). To be more specific, the weight selection unit 223 is configured to determine $W_2$, so as to maximize $\alpha_1 W_1 + \alpha_2 W_2$. The weight selection unit 223 is configured to generate the FBI, by setting the positive and negative of the I-axis component of $W_2$ to the FBI bits of the odd time slots, and by setting the positive and negative of the Q-axis component of $W_2$ to the FBI bits of the even time slots. The FBI generated by the weight selection unit 223 is transmitted to the base station by the radio communication unit 24.

Furthermore, the baseband signal process unit 22 is configured to perform a decision of antenna weights used by the base station actually, what is called, an antenna verification, since there is a case that an error occurs in the FBI during transmission via the uplink. The baseband signal process unit 22 is configured to performs the antenna verification, with using at least one of prediction value of an error rate (BER: Bit Error Rate) of the FBI (a before possibility) and an error rate obtained by using a received signal of a pilot signal included in a dedicated channel (an after possibility). The data decoder 222 can correctly decode data with using the decision result of the antenna verification. Therefore, the mobile station 20$a$ can prevent the quality from deteriorating, due to the occurrence of a difference between antenna weights adopted in the base station and antenna weights which the mobile station assumes. The baseband signal process unit 22 is configured to output the data decoded like this, to an output unit and the like via the interface 21.

(Mobile Communication Method)

Next, as shown in FIGS. 9 and 10, the mobile communication method will be explained. In FIGS. 9 and 10, an arrow of heavy line shows the state in which a radio link (communication channel) is established, and an arrow of thin line shows a notification or an instruction. First, referring to FIG. 9, as shown in FIG. 3($a$), a process when the received power 101 of the RF signal which the mobile station 20$a$ received from the base station 10$a$ becomes high, the received power 102 of the RF signal which the mobile station 20$a$ received from the base station 10$b$ becomes low, and the received power difference between the received power 101 and the received power 102 exceeds the threshold Th of the received power difference will be explained.

At first, the mobile station 20$a$ establishes a radio link with the base station 10$a$ (S101), establishes a radio link with the base station 10$b$ (S103), and is performing soft handover. The base station 10$a$ and the base station 10$b$ have established links with the radio network controller 30 respectively (S102, S104). At the time, the base stations 10$a$ and 10$b$ transmit signals to the mobile station 20$a$ by using the open loop transmit diversity.

As shown in FIG. 3($a$), the mobile station 20$a$ notifies that the received power difference exceeds the threshold Th of the received power difference and the base station 10$b$ whose received power is low (S105), when a difference between the received power 101 of a common pilot channel from the base station 10$a$ and the received power 102 of a common pilot channel from the base station 10$b$ exceeds the threshold Th at the time t1.

The radio network controller 30 determines that the soft handover should be stopped, in accordance with an instruction from the mobile station 20$a$. And, the radio network controller 30 determines to release the radio link between the mobile station 20$a$ and the base station 10$b$ whose received power is low. As a result, since the soft handover status is changed to a status that the mobile station 20$a$ is not during soft handover, the radio network controller 30 determines that the transmit diversity method to be used to transmit a signal to the mobile station 20*a* is the closed loop transmit diversity (S106).

The radio network controller 30 instructs the base station 10*b* to release the radio link (S107). As a result, after the time t1, the radio link between the mobile station 20*a* and the base station 10*b* is released, the communication stops. Further, the radio network controller 30 instructs the base station 10*a* to change the transmit diversity to be used to transmit a signal to the mobile station 20*a* to the closed loop transmit diversity, along with a timing of the change (S108). And, the radio network controller 30 notifies, to the mobile station 20*a*, the release of the radio link with the base station 10*b*, the change of the transmit diversity to the closed loop transmit diversity, and the timing of the change (S109).

And, the mobile station 20*a* and the base station 10*a* keep the establishment of the radio link, and change the transmit diversity to be used to the closed loop transmit diversity at the instructed change timing (S110, S111).

Next, referring to FIG. 10, as shown in FIG. 3(*b*), a process when the received power 102 of the RF signal which the mobile station 20*a* received from the base station 10*b* becomes high, and the received power difference between the received power 101 and the received power 102 becomes equal to or smaller than the threshold Th of the received power difference will be explained.

At first, the mobile station 20*a* establishes a radio link with the base station 10*a* only (S201). The base station 10*a* has established links with the radio network controller 30 (S202). At the time, the base station 10*a* transmits a signal to the mobile station 20*a* by using the closed loop transmit diversity.

As shown in FIG. 3(*b*), the mobile station 20*a* notifies that the received power difference becomes equal to or smaller than the threshold Th of the received power difference and the base stations 10*a* and 10*b* transmitting the RF signals which the mobile station 20*a* receives (S203), when a difference between the received power 101 of a common pilot channel from the base station 10*a* and the received power 102 of a common pilot channel from the base station 10*b* becomes equal to or smaller than the threshold Th at the time t2.

The radio network controller 30 determines that the soft handover should be started, in accordance with an instruction from the mobile station 20*a*. And, the radio network controller 30 determines to establish a new radio link between the mobile station 20*a* and the base station 10*b* transmitting the RF signal which the mobile station 20*a* receives. As a result, the soft handover status is changed from a status that the mobile station 20*a* is not during soft handover to a status that the mobile station 20*a* is during soft handover. Therefore, the radio network controller 30 determines that the transmit diversity method to be used to transmit a signal to the mobile station 20*a* is the open loop transmit diversity (S204).

The radio network controller 30 instructs the base station 10*b* to establish the radio link, along with the open loop transmit diversity as the transmit diversity to be used (S205). As a result, after the time t2, the radio link between the mobile station 20*a* and the base station 10*b* is established, the communication starts.

Further, the radio network controller 30 instructs the base station 10*a* to change the transmit diversity to be used to transmit a signal to the mobile station 20*a* to the open loop transmit diversity, along with a timing of the change (S206). And, the radio network controller 30 notifies, to the mobile station 20*a*, the establishment of the radio link with the base station 10*b*, the change of the transmit diversity to the open loop transmit diversity, and the timing of the change (S207).

And, the mobile station 20*a* and the base station 10*a* keep the establishment of the radio link, and change the transmit diversity to be used to the open loop transmit diversity at the instructed change timing (S208, S209). Furthermore, the mobile station 20*a* and the base station 10*b* establish the radio link (S210), and the base station 10*b* and the radio network controller 30 establish the link (S211). The base station 10*b* transmits a signal with using the open loop transmit diversity.

(Effect)

According to these mobile communication system 100, the radio network controller 30, the base stations 10*a*-10*e*, the mobile stations, and the mobile communication method, the radio network controller 30 can transmit the RF signal with using the optimal transmit diversity method, in accordance with the soft handover status. The base stations 10*a*-10*e* can transmit, to the mobile stations 20*a*-20*c*, the RF signal with using the optimal transmit diversity method, in accordance with the soft handover status. And, the mobile stations 20*a*-20*c* can decode the baseband signal by the method matching a transmit diversity method, when the transmit diversity method is changed in accordance with the soft handover status.

Therefore, in the mobile communication system 100, it is possible to use the transmit diversity method including the open loop transmit diversity and the closed loop transmit diversity optimally, and to improve the received quality in the mobile stations 20*a*-20*c*. As a result, it is possible to increase the radio capacity.

Especially, the radio network controller 30 can make the base stations 10*a*-10*e* to use the open loop transmit diversity during soft handover. There is a possibility that the application of the closed loop transmit diversity during soft handover causes the deterioration of the received quality, due to various deterioration factors including the above deterioration of the received quality of the FBI for indicating the antenna weights and the like. However, the radio network controller 30 can prevent the received quality from deteriorating.

In addition, the radio network controller 30 can make the base stations 10*a*-10*e* to use the closed loop transmit diversity during non-soft handover. Ideally, the closed loop transmit diversity, which uses the FBI for generating the antenna weights to be transmitted from the mobile stations 20*a*-20*c*, can get larger gain, in comparison with the open loop transmit diversity. Therefore, it is possible to improve the received quality in the mobile stations 20*a*-20*c*, by using the closed loop transmit diversity, when soft handover is not performed. Consequently, in the mobile communication system 100, it is possible to alternate the open loop transmit diversity with the closed loop transmit diversity adequately, in accordance with the soft handover status. As a result, in the mobile communication system 100, it is possible to get a beam forming gain by the closed loop transmit diversity, and to perform a stable communication with using the open loop transmit diversity during soft handover. In the other hands, in the mobile communication system 100, it is possible to achieve an effect for increasing the radio capacity by the closed loop transmit diversity, and to avoid the deterioration of the downlink capacity caused by the deterioration of the received quality of the FBI in the base station during soft handover.

Modified Example

The present invention is not limited to the above embodiment, and various modification can be applied to the present invention. For example, the present invention can be applied to any mobile communication systems and any mobile communication methods which perform the transmit diversity with using a plurality of antennas, as well as the mobile communication systems and mobile communication methods in accordance with the specification (for example, 3GPP, TS25.211, TS25.212, TS25.213, TS25.214 and the like) of the 3GPP (3rd Generation Partnership Project).

And, in the mobile communication system which divide the radio area into a plurality of sector units, the determination unit 32 of the radio network controller 30 as shown in FIG. 2 can determine that the transmit diversity method to be used is the open loop transmit diversity, while the mobile station is during inter-base-station soft handover during which the mobile station establishes a plurality of radio links with a plurality of base stations. On the other hand, the determination unit 32 can determine that the transmit diversity method to be used is the closed loop transmit diversity, while the mobile station is during intra-base-station soft handover during which the mobile station establishes a plurality of radio links with a base station, or while the mobile station is not during soft handover.

The intra-base-station soft handover is performed, when the mobile station is located in the position where different sectors of the same cell overlap. In this case, the control units 23 of the mobile station 20a-20c as shown in FIG. 8 are configured to perform the notification, when the received power difference received from the radio communication unit which covers different sectors exceeds the threshold of the received power difference, or when the received power difference becomes equal to or smaller than the threshold. At the time, the control unit 23 is configured to notify the base station transmitting the RF signal which the mobile station receives.

The determination unit 32 is configured to determine, based on the notification from the mobile station, that the soft handover should be stopped, when the received power difference exceeds the threshold of the received power difference. And, the determination unit 32 is configured to determine to release the radio link between the mobile station 20a and the radio communication unit which covers a sector whose received power is low. Further, the determination unit 32 is configured to determine that the transmit diversity method to be used is the closed loop transmit diversity.

On the other hand, the determination unit 32 is configured to determine, based on the notification from the mobile station, that the soft handover should be started, when the received power difference becomes equal to or smaller than the threshold of the received power difference. And, the determination unit 32 is configured to determine to establish the radio link between the mobile station 20a and the radio communication unit which covers sectors transmitting the RF signals which the mobile station receives. At the time, the determination unit 32 is configured to judge whether the base station which covers sectors transmitting the RF signals which the mobile station receives is a same base station or different base stations. When the base station is a same base station, since intra-base-station soft handover is performed, the determination unit 32 is configured to determine to use the closed loop transmit diversity. When the base station is different base stations, since inter-base-station soft handover is performed, the determination unit 32 is configured to determine to use the open loop transmit diversity.

In this way, the determination unit 32 can change transmit diversity method, in accordance with the change of the number of base stations with which the mobile station communicates simultaneously. To be more specific, the determination unit 32 can change the transmit diversity method to be used, to the open loop transmit diversity, when the number of base stations with which the mobile station connects simultaneously is changed from one to plural number. The determination unit 32 can change the transmit diversity method to be used, to the closed loop transmit diversity, when the number of base stations with which the mobile station connects simultaneously is changed from plural number to one. Except for these point, the radio network controller 30 can perform a similar process to the above embodiment.

In this case, as shown in FIG. 4, the base station includes a radio communication unit, an amplification unit, and an antenna, for each sector, in order to cover a plurality of sectors. Further, there is one radio communication unit, one amplification unit, and one antenna, per sector, so as to perform the transmit diversity for each sector. The baseband signal process unit 12 can perform the similar process to the baseband signal process unit 12 as shown in FIG. 4, except for generating the baseband signal for each sector.

By determining the transmit diversity in this way, the radio network controller 30 can make the base station to use the open loop transmit diversity during inter-base-station soft handover which has a high possibility of deteriorating of the received quality by the application of the closed loop transmit diversity, so as to avoid the deterioration of the received quality. In addition, the radio network controller 30 can make the base station to use the closed loop transmit diversity during intra-base-station soft handover which has a relatively low possibility of deteriorating of the received quality by the application of the closed loop transmit diversity or during non-soft handover, so as to improve of the received quality in the mobile station with using the FBI from the mobile station.

Furthermore, in the mobile communication system 100 according to the above embodiment, though the determination unit 32 is provided in the radio network controller 30, the location where the determination unit 32 is provided is not limited, and the determination unit 32 can be provided in any location of the mobile communication system. For example, the control units 23 of the mobile stations 20a-20c can function as the determination unit configured to the transmit diversity method to be used to a signal transmitted by the base station, in accordance with the soft handover status.

In this case, the control unit 23 can detect the establishment status of the radio link of the radio communication unit, and judge the soft handover status. The control unit 23 can function as the instruction unit configured to instruct the transmit diversity method the base station, in accordance with the determination result. The control unit 23 can generate the control data including the instruction, similarly to the instruction/notification unit 33 as shown in FIG. 2, and transmit the generated control data to the base station. The baseband signal process unit 22 can decode the baseband signal, in accordance with the determination result by the control unit 23. According to this, the mobile stations 20a-20c can determine the optimal transmit diversity method which the mobile stations want to make the base station to use, and make the base station to transmit the RF signal with using the optimal transmit diversity method. In addition, it is possible to perform a load balance within the mobile communication system.

INDUSTRIAL APPLICABILITY

As has been described, according to the present invention, it is possible to use the transmit diversity adequately, and to improve the received quality in the mobile station.

The invention claimed is:
1. A radio network controller comprising:
a determination unit configured to determine a type of transmit diversity method to be used to transmit a signal from a base station to a mobile station, in accordance with a soft handover status of the mobile station; and an instruction unit configured to instruct the type of transmit diversity method to the base station, in accordance with the determination result by the determination unit, wherein the determination unit is configured to determine that the type of transmit diversity method to be used is an open loop transmit diversity, when the mobile station is during inter-base-station soft handover in which the mobile station establishes a plurality of radio links with a plurality of base stations, and the determination unit is configured to determine that the type of transmit diversity method to be used is a closed loop transmit diversity, when the mobile station is during intra-base-station soft handover in which the mobile station establishes a plurality of radio links with a base station, or when the mobile station is not during soft handover.

2. The radio network controller according to claim 1, wherein the determination unit is configured to determine that the type of transmit diversity method to be used is an open loop transmit diversity, when the mobile station is during soft handover; and the determination unit is configured to determine that the type of transmit diversity method to be used is a closed loop transmit diversity, when the mobile station is not during soft handover.

3. The radio network controller according to claim 1, wherein the determination unit is configured to judge the soft handover status, in accordance with a received power difference of radio frequency signals from the base station in the mobile station for judging whether or not to perform soft handover, and a threshold of the received power difference.

4. A mobile communication system comprising:

a determination unit configured to determine a type of transmit diversity method to be used to transmit a signal from a base station to a mobile station, in accordance with a soft handover status of a mobile station; and a base station configured to generate a baseband signal, in accordance with the determination result by the determination unit, and to transmit, to the mobile station, a radio frequency signal which is obtained by performing a frequency conversion on the baseband signal, wherein the determination unit is configured to determine that the type of transmit diversity method to be used is an open loop transmit diversity, when the mobile station is during inter-base-station soft handover in which the mobile station establishes a plurality of radio links with a plurality of base stations, and the determination unit is configured to determine that the type of transmit diversity method to be used is a closed loop transmit diversity, when the mobile station is during intra-base-station soft handover in which the mobile station establishes a plurality of radio links with a base station, or when the mobile station is not during soft handover.

5. A radio communication method comprising:

determining a type of transmit diversity method to be used to transmit a signal from a base station to a mobile station, in accordance with a soft handover status of a mobile station;

generating a baseband signal, in accordance with the determination result; and transmitting, to the mobile station, a radio frequency signal which is obtained by performing a frequency conversion on the baseband signal, wherein the determining includes determining that the type of transmit diversity method to be used is an open loop transmit diversity, when the mobile station is during inter-base-station soft handover in which the mobile station establishes a plurality of radio links with a plurality of base stations; and the determining includes determining that the type of transmit diversity method to be used is a closed loop transmit diversity, when the mobile station is during intra-base-station soft handover in which the mobile station establishes a plurality of radio links with a base station, or when the mobile station is not during soft handover.

6. The radio network controller according to claim 2, wherein the determination unit is configured to judge the soft handover status, in accordance with a received power difference of radio frequency signals from the base station in the mobile station for judging whether or not to perform soft handover, and a threshold of the received power difference.

7. The radio network controller according to claim 1, wherein the determination unit is configured to judge the soft handover status, in accordance with a received power difference of radio frequency signals from the base station in the mobile station for judging whether or not to perform soft handover, and a threshold of the received power difference.

* * * * *